United States Patent [19]

Lake et al.

[11] 4,108,639

[45] Aug. 22, 1978

[54] PROCESS FOR RECOVERING PLATINUM GROUP METALS FROM ORES ALSO CONTAINING NICKEL, COPPER AND IRON

[75] Inventors: Malcolm John Lake, Pickering; William Richard Noble Snelgrove, Oakville, both of Canada

[73] Assignee: Johns-Manville Corporation, Denver, Colo.

[21] Appl. No.: 793,903

[22] Filed: May 4, 1977

Related U.S. Application Data

[63] Continuation-in-part of Ser. No. 703,995, Jul. 9, 1976, abandoned.

[51] Int. Cl.$^2$ .......................................... C22B 11/04
[52] U.S. Cl. .................................. 75/101 R; 75/83; 75/108; 75/109; 75/115; 75/116; 75/117; 75/119; 75/121; 423/22; 423/36; 423/140
[58] Field of Search ................. 75/83, 24, 101 R, 115, 75/116, 117, 119, 121, 108, 109; 423/22, 36, 140

[56] References Cited

U.S. PATENT DOCUMENTS 3,293,027  12/1966  Mackiw et al. ................... 75/115

OTHER PUBLICATIONS

J. P. Martin et al., Nat. Institute for Metallurgy, 3-7-75, Johannesburg, South Africa, No. 1720, pp. 1-24.

Primary Examiner—M. J. Andrews
Attorney, Agent, or Firm—Robert M. Krone; Joseph J. Kelly; James W. McClain

[57] ABSTRACT

A process is described for the separation of platinum group metals (PGM) from ores also containing iron, nickel and copper as sulfides. The minerals in the ore are first concentrated by flotation and the ore concentrate is melted in an electric furnace to form a matte containing at least 95% of the precious metals. The matte is granulated while molten to granules of a mean size not greater than about 210 micrometers ($\mu$m) and then pressure leached with sulfuric acid and oxygen to separate the nickel, iron and copper as their respective sulfates, while recovering the PGM as a residue. Concentration of the leach residue by roasting and subsequent acid leaching yields a final PGM product containing the major portion of the precious metals in the ore and substantially all (i.e., at least about 95%) of the precious metals in the ore concentrate and which contains less than 1% total nickel, iron and copper. The iron, nickel and copper in the leach solution can be subsequently recovered and/or discarded as, respectively, natrojarosite, nickel or copper metal or various compounds such as sulfides, hydroxides, or oxides, as appropriate to the specific application.

27 Claims, 4 Drawing Figures

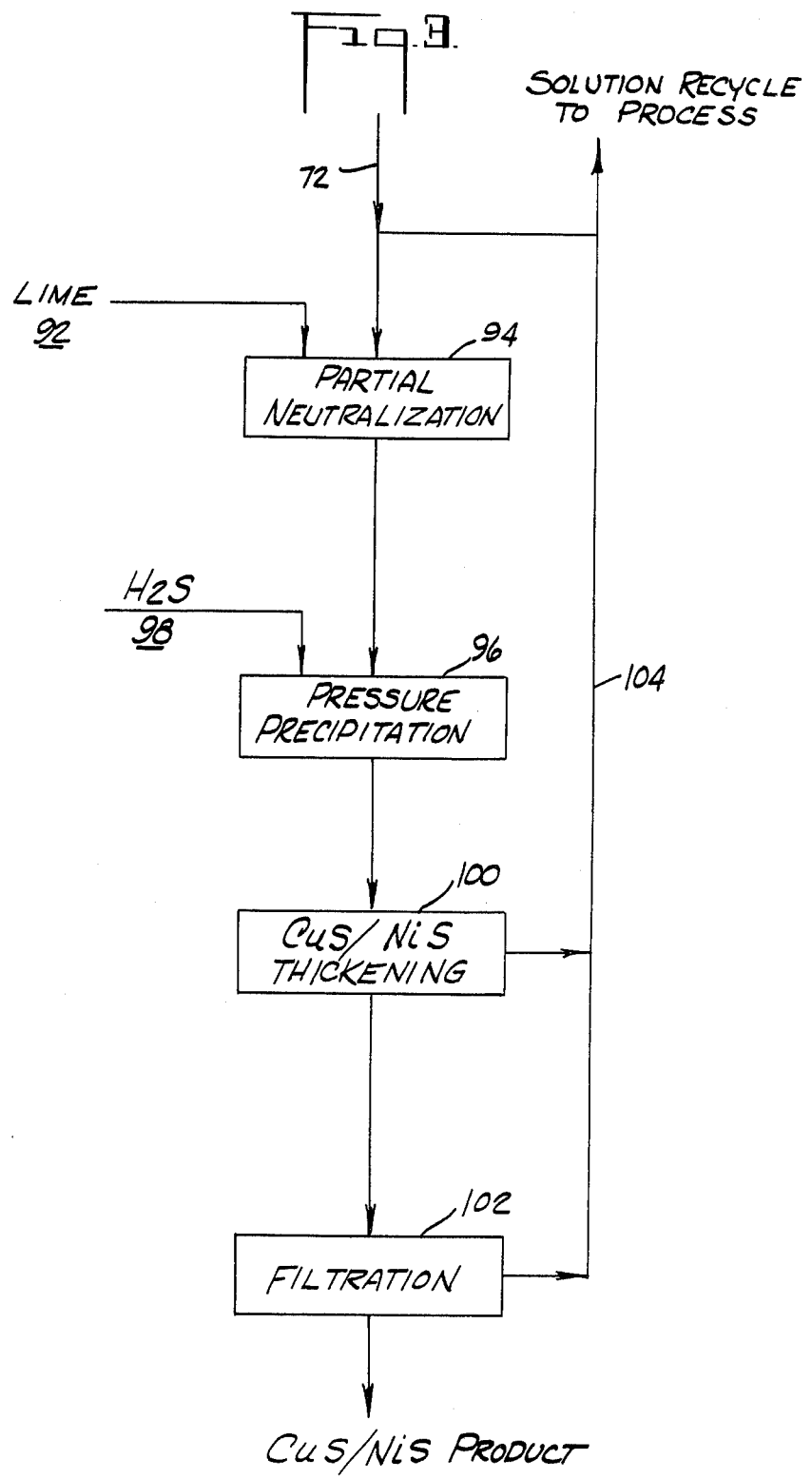

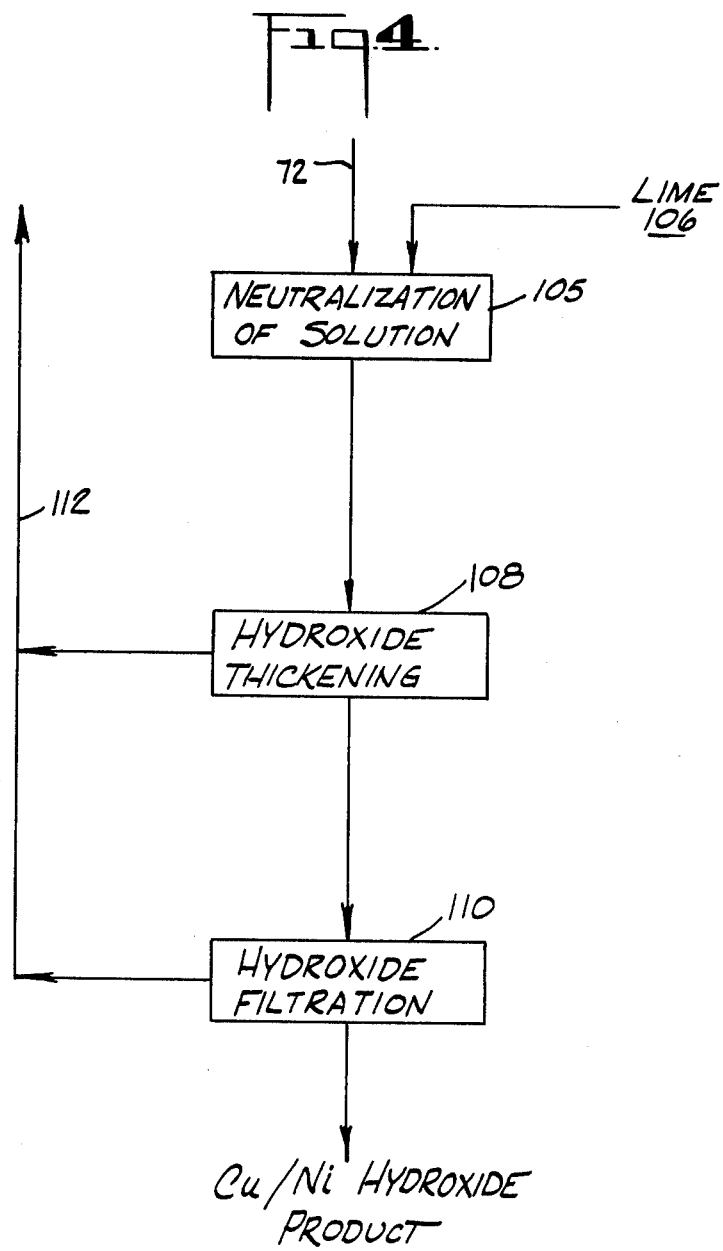

PROCESS FOR RECOVERING PLATINUM GROUP METALS FROM ORES ALSO CONTAINING NICKEL, COPPER AND IRON

CROSS-REFERENCE TO RELATED APPLICATION

This application is a continuation-in-part of application Ser. No. 703,995, filed July 9, 1976 now abandoned.

BACKGROUND OF THE INVENTION

The invention herein relates to processes for recovering platinum group metals in concentrated form from their ores. More particularly, it relates to a process for recovering a platinum group metal concentrate from an ore containing, in addition to the platinum group metals, nickel, copper and iron.

Platinum group metals (hereinafter sometimes referred to as "PGM") may be associated in ores and their concentrates with iron, copper and nickel sulfides. It has been known in the past to separate and refine these ores by conventional pyrometallurgical techniques, in which the various other materials (notably iron) are removed at intermediate steps in the process, leaving a PGM residue as the end product. A typical example is illustrated in U.S. Pat. No. 1,841,207. However, such processes generate large amounts of sulfurous gas emissions, notably $SO_2$ in combination with minor amounts of other sulfur oxides, and they have thus become environmentally unacceptable unless complex and expensive pollution control devices are incorporated into the processes to control the sulfur emissions.

In U.S. Pat. No. 3,293,027 a two-stage hydrometallurgical process is shown where the principal aim is to recover nickel and cobalt from a ground metal matte containing 60 to 75% nickel, lesser amounts of cobalt and copper, and small quantities of platinum group metals, iron, sulfur, and especially arsenic. A preliminary hydrometallurgical treatment is used to separate the precious metals in a residue which also contains the bulk of the arsenic and iron, as well as some nickel and other non-ferrous metals. Further treatment (such as cyanidation) is thus required to separate the precious metals from the iron and arsenic. U.S. Pat. No. 1,896,807 illustrates collection of the platinum group metals in a high copper content matte and then further refinement to separate the precious metals from the copper. U.S. Pat. No. 1,863,807 illustrates separation of a matte containing copper, lead, iron and precious metals from an ore also containing cobalt, nickel, arsenic and antimony. U.S. Pat. No. 2,425,760 illustrates separation by controlled cooling of a molten matte of copper and nickel in the form of sulfides from a metal alloy containing the precious metals. U.S. Pat. No. 2,777,764 illustrates a hydrometallurgical process for dissolving refractory ores and recovering precious metals therefrom by cyanidation. U.S. Pat. No. 2,829,967 discloses a process for separating platinum group metals from copper-iron-nickel sulfide ores by roasting the non-precious metals to oxides, chlorides or sulfates, leaching the salts to separate the iron and PGM, then chloride treating the solution to separate the iron and finally precipitating the PGM with a non-precious metal, such as copper or iron. U.S. Pat. No. 1,634,497 discloses a process for two-stage roasting and leaching of copper-PGM ores to separate the metals. U.S. Pat. No. 3,767,760 discloses a process for acid leaching and aqua regia separation of PGM from copper ores. Other patents of interest illustrating separation processes having some relation to the present process for obtaining platinum group metals include U.S. Pat. Nos. 1,542,935; 1,983,274; 3,332,771; 3,576,620; 3,785,944; 3,793,430; 3,798,304; 3,816,105; and 3,879,272.

Also of pertinence is "The Initial Development of Processes for the Direct Leaching of Iron-Nickel-Copper Mattes Containing Platinum-Group Metals and for the Production of Ferronickel," by J. P. Martin et al. Report No. 1720, National Institute for Metallurgy, Johannesburg, South Africa (Mar. 7, 1975). This report describes a process in which PGM are partially separated from an ore containing copper, iron and nickel by a series of steps involving smelting, granulation and atmospheric acid leaching with dilute sulfuric acid. In this process hydrogen sulfide is formed and the PGM are not fully separated but rather are retained in a major copper sulfide component.

OBJECTS OF THE INVENTION

It is an object of this invention to provide a hydrometallurgical technique for separating platinum group metals from ores also containing nickel, copper and iron in an environmentally acceptable manner.

It is also an object of this invention to provide a process for separating platinum group metals from ores containing nickel, copper and iron, wherein the platinum group metals are separated first, thus minimizing the processing needed to recover the precious metals and giving the producer an option as to further treating of the residue containing the remaining metals.

It is further an object of this invention to provide a process which can be economically utilized on PGM ore deposits which are for any reason mined at a relatively low production rate.

BRIEF SUMMARY OF THE INVENTION

The invention herein is a process for the separation of a platinum group metal concentrate from ores containing PGM, nickel, copper and iron. The process comprises first concentrating the ore by flotation to form a concentrate and then subjecting the concentrate to electric furnace melting to form a low grade matte; granulation of the matte to form granules; leaching the metals from the matte granules under pressure in the presence of sulfuric acid, oxygen and water; filtering the leached materials to obtain a filtrate containing dissolved salts of nickel, iron and copper and a filter cake containing the precious metals; sulfation roasting the filter cake; and subsequently acid leaching metals from the roasted filter cake and filtering the leached materials at least once more to further concentrate the PGM, and finally drying the filter cake from the last of the subsequent filtrations to produce a PGM concentrate containing at least 25% platinum group metals and less than 1% copper, nickel and iron.

In a further embodiment of the invention, the filtrate is thereafter treated with sodium ion under appropriate conditions in the sulfate ion containing solution to precipitate the iron in the form of natrojarosite. The filtrate may then be further treated with sodium acid sulfide to produce copper sulfide which is removed by filtration, and the filtrate may thereafter be treated with lime to produce nickel hydroxide as a precipitate. Alternatively, after natrojarosite precipitation the filtrate may be neutralized to precipitate the copper and nickel as their hydroxides or treated under pressure with hydrogen sulfide to produce mixed copper and nickel sulfides.

The copper and nickel compounds may be recovered and the natrojarosite discarded, since the latter is merely a synthetically produced version of a common mineral occurring in nature and is chemically stable and environmentally acceptable.

BRIEF DESCRIPTION OF THE DRAWINGS

FIG. 3 illustrates schematically another embodiment of that part of the present process in which the nickel and copper components are recovered.

FIG. 4 illustrates schematically a third embodiment of that part of the present process in which the nickel and copper components are recovered.

DETAILED DESCRIPTION AND PREFERRED EMBODIMENTS

Figure 1:
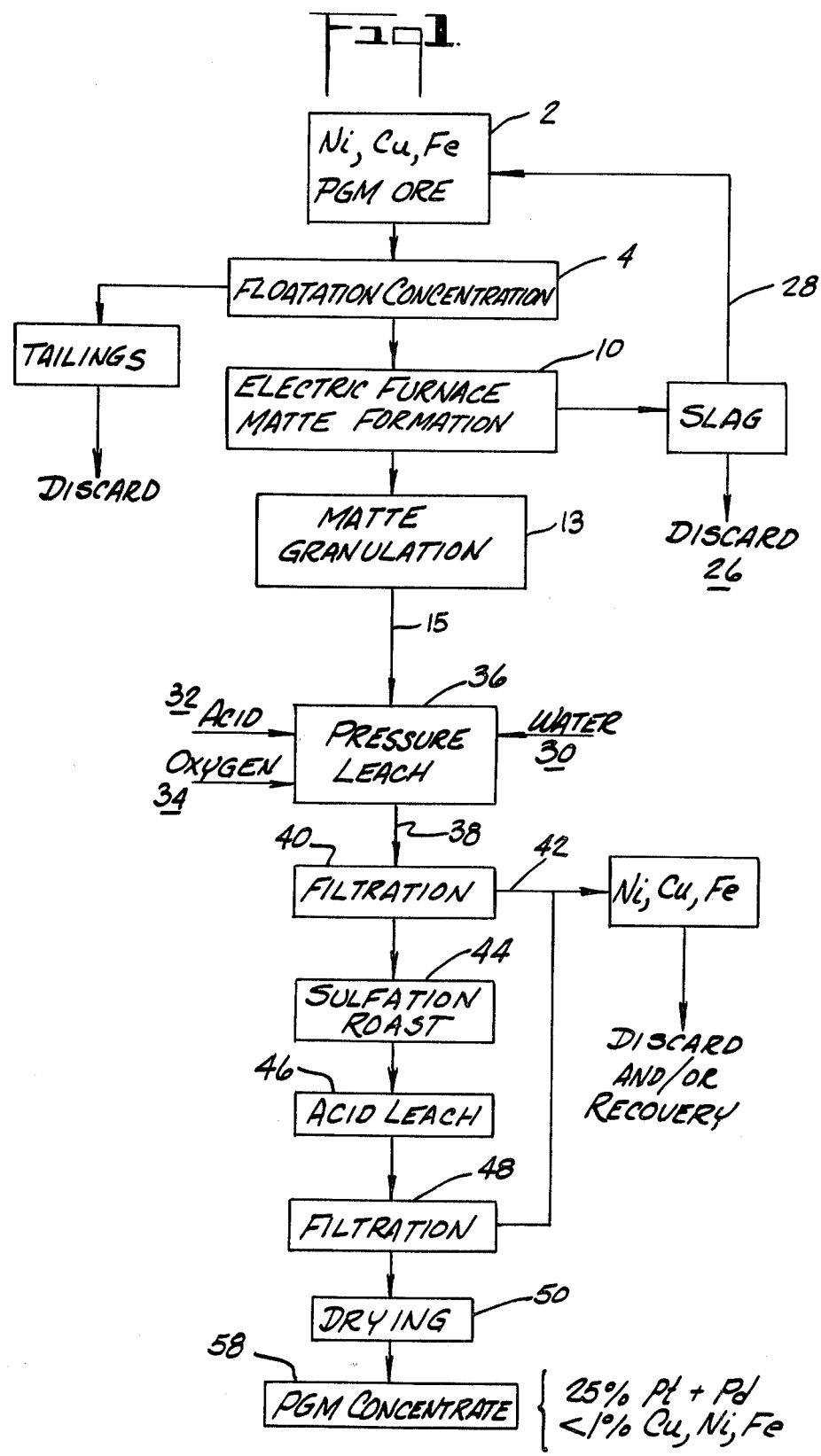
FIG. 1 illustrates schematically the process of this invention for obtaining the PGM concentrate.

The initial ore 2 from a mine (which in a typical instance contains approximately 0.05% to 0.2% copper, 0.10% to 0.25% nickel and approximately 0.15 to 1.0 ounce of precious metals per ton) is passed to a flotation concentration process 4. This is a conventional flotation concentration system wherein the major portion of the gangue is removed leaving a concentrate 5 which comprises approximately 1 to 5% of the original ore. (All percentages stated herein are percentages by weight.)

This mill concentrate is fed into an electric furnace 10 either in its initial particulated form or it may be pelletized in pelletizing unit 6 and fed as pellets. In either case it is combined with flux 8 (typically limestone and hematite) to form the furnace charge. Also included in the electric furnace may be recycles of process dust and reverts. In the electric furnace slag resistance melting causes the entire charge to melt and separate to form a lower layer of sulfidic matte and an upper layer of slag containing the silica, magnesium and alumina in the concentrate. Slag is formed at about four times the rate of matte formation, and may be tapped continuously or intermittently as required and granulated, as by high pressure water sprays, for discard.

The matte is periodically tapped through line 11 and granulated in unit 13 to form a finely divided material for further processing. By "finely divided" is meant that the mean particle size of the matte granules is not greater than 210 μm (65 mesh, Tyler Sieve Series). It is preferred to obtain matte having this particle size by mechanically striking a stream of molten matte with a rotating impeller and simultaneously quenching the matte droplets thus formed with a high pressure water spray. The granulation step renders the matte more amenable to the subsequent leaching process when the latter is carried out in the preferred temperature range of 100° to 140° C (212° to 284° F). In particular, the degree of separation subsequently obtained between the PGM into the residue and the base metals into the solution is substantially enhanced when compared, for instance, to a matte which is coarsely granulated to a mean size of only 600 to 700 μm.

A small amount of sulfur dioxide is formed by the combustion of sulfur distilling from the melting concentrate. This sulfur, however, amounts to only about 10 to 25% of the sulfur in the entire furnace feed. Since no more than about 25% of the sulfur entering the process is expelled in a gaseous form, the application of any of a number of conventional sulfur oxide recovery systems, such as lime scrubbers, will effect adequate emission abatement.

Figure 2:
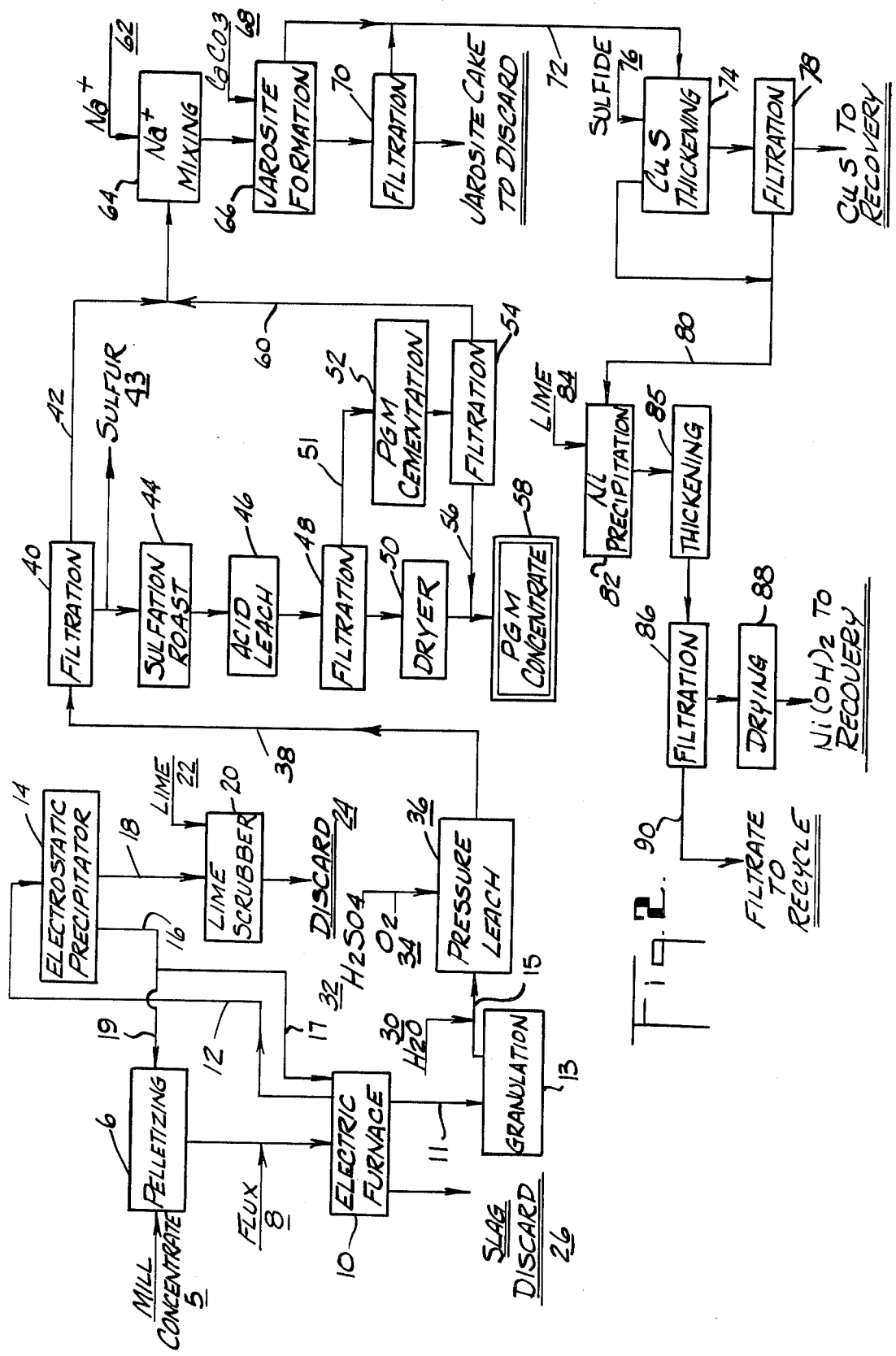
FIG. 2 is a schematic flow diagram illustrating recovery of the PGM concentrate and, in addition, one embodiment of the present process for further treating and separation of the iron, copper and nickel components.

FIG. 2 illustrates a typical manner of handling the furnace dust and sulfur oxides. The off gases containing fine dust are removed through line 12 and sent to electrostatic precipitator 14. The precipitated dust is removed through line 16 and is returned to the furnace directly through line 17 or it may be fed to pelletizing unit 6 through line 19. The $SO_2$ and any other sulfurous gases may be passed through line 18 to lime scrubber 20 where they are contacted with lime 22 and reacted to form calcium sulfate and sulfite, which may be discarded as indicated at 24. The slag separated from the matte in the electric furnace may be discarded as indicated at 26 and/or recycled as indicated at 28.

To obtain a matte size which is best suited for subsequent processing steps the granulated matte is now preferably further comminuted by grinding in a ball mill to a particle size range of at least 50% minus 400 mesh (37 μm), and preferably at least 60% minus 400 mesh (37 μm).

The electric furnace matte now passed to the pressure leaching unit 36 through line 15 contains virtually all of the copper, nickel, platinum group metals and over 70% of the iron and 75% of the sulfur in the original ore, and will generally comprise less than 1% of the original ore weight. The pressure leaching process serves to dissolve as much of the copper, nickel and iron as possible by oxidation in the presence of the sulfur in the matte to form copper, nickel and iron sulfates. The reaction is carried on in the presence of water 30, sulfuric acid 32 and oxygen 34 in a pressure vessel 36. Sulfuric acid addition will be in amounts of about 0.8 to 2.0 lb acid per lb of matte feed, preferably 1.2 to 1.6 lb acid per lb of matte feed. Sufficient oxygen is added to maintain a total pressure of 40 to 155 psia (2.7 to 10.5 atm), preferably 70 to 125 psia (4.8 to 8.5 atm) in the pressure vessel (or autoclave). Reaction temperature is maintained at approximately 100° to 140° C (210° to 285° F), preferably 110° to 130° C (230° to 265° F) and typical residence time is approximately 2 to 6 hours, preferably 3 to 4 hours. The extent of the reaction is limited to dissolution of about 94 to 98% (preferably 95 to 97%) of the weight of the matte. Beyond this point it has been found that the platinum group metals, particularly palladium and rhodium, begin to dissolve more markedly.

The pressure leached residue is transferred through line 38 to filtration unit 40, which may be a conventional plate and frame pressure filter or other device suitable for the filtration of hot liquors. The solid residue containing approximately 1 to 8% PGM is retained as a cake on the filter while the acidic solution containing the dissolved iron, nickel and copper sulfates is removed as a filtrate liquid through line 42. The specific percentage of PGM will depend in part on the elemental sulfur content of the residue, with more PGM content where there is less elemental sulfur content.

The filter cake is now subjected to a refinement process to upgrade the PGM content at the expense of any remaining copper, nickel, iron and sulfur, since the latter metals should generally be reduced to less than 1% total in the PGM concentrate in order to assure that the latter will normally be acceptable to a PGM refinery. Elemental sulfur is first removed by volatilization in an inert atmosphere, by dissolution in an organic solvent, or by hot filtration, as indicated at 43.

The filter cake is then subjected to roasting in unit 44 in a controlled atmosphere of oxygen at about 450° to 525° C (840° to 975° F), preferably about 500° C (930° F), to convert the sulfides to copper, nickel and iron sulfates respectively. The amount of sulfur not taken up by the controlled oxidation passes off as sulfur dioxide and may be collected in an appropriate sulfate emission control system such as the lime scrubber previously described. The sulfated materials are then acid leached in unit 46 with dilute $H_2SO_4$ and the acid leached material is filtered in unit 48. For best results the concentration of the acid should not exceed about 750 gm/l (7.7 molar). The filter cake is dried in unit 50.

In order to maximize the recovery of precious metals, the filtrate is passed through line 51 to a cementation step to recover any dissolved platinum group metals in unit 52. Such concentration may be achieved by the addition of cementing agents to the PGM solution while it is being agitated in a stirred vessel. Typical cementing agents which may be used include metals such as iron sponge, iron powder and nickel powder, preferably iron powder. The filtrate containing the cemented precious metals is then filtered a second time in unit 54 and the solids returned to the precious metal recovery system as indicated at 56. These solids are blended with the solids of the drier 50 and the entire material collected as platinum group metal concentrate 58. If desired, all or part of the entire series of concentration steps of sulfation roasting, acid leaching, filtration, cementation and drying may be repeated several times. It is especially advantageous to repeat the acid leaching and filtration steps at least once. The recovered PGM concentrate, which typically comprises less than 0.01 weight percent of the original ore, nonetheless contains more than 80% of the palladium and platinum in the original ore. The concentrate itself contains on the order of 25 to 80% precious metals and less than 1% total iron, nickel and copper, depending on the exact treatment characteristics of the original ore.

Iron recovery in the form of a jarosite is illustrated in FIG. 2. The two quantities of filtrate from filtration units 40 and 54 are passed respectively through lines 42 and 60 to be mixed and blended with sodium ion 62 in unit 64 in the presence of sulfate ion. Commonly the filtrate itself contains sufficient sulfate ion for the jarosite formation reaction, so the sodium ion may be in the form of any soluble ionizable sodium compound which does not impart a detrimental anion to the system (i.e., an anion which causes undesirable reactions with other components of the system or which is difficult to separate or handle subsequently). Sodium carbonate has been used successfully as the source of sodium ion. It is also possible to use sodium sulfate as the source of sodium ion where the filtrate is low in sulfate ion or where the presence of excess sulfate ion is not objectionable. The sodium ion, sulfate ion and iron react to form a sodium-iron double sulfate known as natrojarosite. This is precipitated in unit 66 in the presence of calcium carbonate 68 in the form of pulverized limestone or as calcium oxide in the form of lime (preferably limestone). The limestone is added continuously to maintain a pH in the range of 1.1 to 1.6 (preferably 1.4 to 1) for a period of 2 to 5 hours (preferably about 3 to 4 hours) at a temperature of 85° to 95° C (185° to 205° F). The natrojarosite is first thickened and then filtered in unit 70, which comprises a top fed horizontal belt filter, washed and removed for discard. The liquids from the lime treating unit 66 and the filtration unit 70 may be collected and passed through line 72 for further treating to separate copper and nickel. Many details of natrojarosite formation and separation are illustrated in U.S. Pat. Nos. 3,434,798; 3,434,947; 3,493,365; 3,684,490 and 3,691,038. The natrojarosite, being a mineral occurring in nature, may be safely discarded with a minimum of environmental impact.

The filtrate liquid, now largely free of iron, may as noted be further treated to recover the copper and/or nickel values in any of the alternative processes shown in FIGS. 2, 3 and 4. In the embodiment shown in FIG. 2, the filtrate is passed to thickening unit 74 where it is contacted with a reactive sulfide 76 (preferably sodium acid sulfide or hydrogen sulfide) under conventional conditions. This causes the copper sulfate to precipitate as copper sulfide which is removed by filtration in unit 78. This precipitate is composed of about 55% copper and less than 4% nickel. It thus contains approximately 70 to 75% of the original copper and only about 2 to 3% of the original nickel from the ore. While thus not a pure copper sulfide, it is sufficiently concentrated in copper to be acceptable as a feed to a copper smelter.

The remaining liquid, now containing principally nickel, is passed through line 80 to precipitation unit 82 where the nickel is precipitated in the presence of lime 84 under conventional conditions. The precipitate is then thickened in unit 85, filtered in unit 86 and dried in unit 88 and recovered in the form of nickel hydroxide. The nickel hydroxide precipitate contains approximately 10 to 15% nickel and less than 0.1% copper. It thus contains approximately 65% of the original nickel content of the ore and less than 1% of the original copper content, calcium sulfate being the principal diluent. As with the copper sulfide precipitate, the nickel hydroxide precipitate is sufficiently concentrated in nickel to be acceptable as feed to a nickel refinery or smelter. The remaining filtrate liquid can be recycled through line 90 back to the original pressure leaching operation and/or other parts of the process as dilution and/or wash water to maximize recovery of all metal.

More preferably, however, as shown in FIG. 3, the filtrate liquid in line 72 may be treated to precipitate the contained copper and nickel as a mixed sulfide. In this method the filtrate from jarosite precipitation is diluted in the ratio of 2–3 parts of recycled tail liquor to one part of filtrate. After increasing the pH of the diluted solution to about 3.5 with lime 92 in unit 94, the resultant solution is treated in autoclave 96 in the presence of hydrogen sulfide gas 98 at a total pressure of about 115 psia (7.8 atm) and about 130° C (265° F) to precipitate the metals as mixed sulfides containing substantially all of the contained metals (including a small amount of residual iron) and normally analyzing 21 to 23% copper, 32 to 36% nickel, less than 1% iron, and 30 to 32% sulfur. This precipitate is removed from the vessel 96, thickened in unit 100, and passed to filtration unit 102 (preferably a plate-and-frame filter). The filter cake, after washing, is suitable for sale while the filtrates may be recycled as at 104 to the original oxygen pressure leaching operation and/or to other parts of the operation for re-use and maximum recovery of metals.

In a further alternative method (shown in FIG. 4) for removing the copper and nickel as hydroxides from the solution in stream 72, the whole stream is contacted in unit 105 with lime 106 to raise the pH to 8 to 9 at a temperature of between 50° to 70° C (120° to 160° F), preferably about 60° C (140° F). All of the copper, nickel and residual iron, and substantially all of the calcium, are contained in a low grade precipitate normally analyzing 4 to 5% copper, 12 to 14% nickel, 1 to 2% iron and 18 to 20% calcium. As with the previous two alternative methods, the precipitate is thickened in unit 108 and then removed from the solution by a use of a suitable filtration device 110, the filtrates being recycled to the process as at 112.

A principal advantage of any of these process embodiments is that they yield a copper and nickel product suitable for further treatment. This is done at a low cost, with simple equipment as is suitable for small operations and without the introduction of soluble cations such as ammonium ion which introduce an expensive waste disposal problem into the process.

Although the three previously cited techniques for copper and nickel removal are the preferred techniques for a small operation, it would also be possible to recover copper and nickel from the solutions, after iron removal, as metals or oxides with a high degree of purity by such techniques as cementation, solvent extraction purification, electrowinning and other conventional techniques of copper and nickel hydrometallurgy. However, such methods require a considerable capital investment in process equipment and are only economically justified where the production of by-product copper and nickel is high enough.

What is claimed is:

1. A process for the separation of a platinum group metal concentrate from an ore containing iron, nickel and copper in addition to said platinum group metals, which process comprises:
   (a) concentrating said ore by flotation to form a concentrate;
   (b) subjecting said ore concentrate to electric furnace melting to form a low grade matte;
   (c) granulating said matte to form granules;
   (d) leaching metals from said granules in the presence of sulfuric acid, oxygen and water;
   (e) filtering the leached metals to obtain a filtrate predominately containing dissolved salts of said iron, nickel and copper and a filter cake predominately containing said platinum group metals;
   (f) sulfation roasting said filter cake;
   (g) acid leaching coper, nickel and iron metals from the roasted filter cake; and
   (h) filtering and recovering a solid platinum group metal concentrate from said roasted and leached filter cake.

2. The process of claim 1 wherein said granulation of step (c) comprises mechanically striking a molten stream of said matte with a rotating impeller and simultaneously quenching the granules with a high-pressure water spray.

3. The process of claim 1 wherein said granules are of sizes such that at least 50% are less than 37 $\mu$m.

4. The process of claim 2 further including mechanically grinding said matte granules to a particle size such that at least 50% are less than 37 $\mu$m.

5. the process of claim 4 wherein at least 60% of the mechanically ground particles are less than 37 $\mu$m.

6. The process of claim 1 wherein said sulfation roasting, acid leaching and filtration of steps (f), (g) and (h) are repeated at least once.

7. The process of claim 1 wherein said leaching of step (d) is conducted at a temperature of 100° to 140° C.

8. The process of claim 7 wherein said leaching is conducted at a temperature of 110° to 130° C.

9. The process of claim 1 wherein said leaching of step (d) is conducted with a sulfuric acid concentration of 0.8 to 2.0 pounds of acid per pound of said granules.

10. The process of claim 9 wherein said leaching is conducted with a sulfuric acid concentration of 1.2 to 1.6 pounds of acid per pound of said granules.

11. the process of claim 1 wherein said leaching of step (d) is conducted with sufficient oxygen to maintain a reaction pressure of 40 to 155 psia.

12. The process of claim 11 wherein said leaching is conducted with sufficient oxygen to maintain a reaction pressure of 70 to 125 psia.

13. The process of claim 1 wherein said leaching of step (d) is conducted for a period of 2 to 6 hours.

14. The process of claim 13 wherein said leaching is conducted for a period of 3 to 4 hours.

15. The process of claim 1 wherein said roasting of step (f) is conducted in an oxygen atmosphere at a temperature of 450° to 525° C.

16. The process of claim 1 further comprising:
   (i) passing filtrate from step (h) through concentration with a cementing agent and then filtering the cemented materials prior to recovery of the platinum group metal concentrate.

17. The process of claim 16 wherein said cementing agent is iron powder.

18. The process of claim 1 further comprising:
   (i) contacting the filtrate of step (e) with sodium ion and sulfate ion in a solution to convert the iron in said filtrate to natrojarosite and precipitating and separating said natrojarosite from said solution.

19. The process of claim 18 wherein said conversion of iron to natrojarosite is conducted at a solution pH in the range of 1.1 to 1.6.

20. The process of claim 19 wherein said solution pH is in the range of 1.4 to 1.6.

21. The process of claim 18 wherein said conversion of iron to natrojarosite is conducted for a reaction time of 2 to 5 hours.

22. The process of claim 21 wherein said conversion of iron to natrojarosite is conducted for a reaction time of 3 to 4 hours.

23. The process of claim 18 wherein said conversion of iron to natrojarosite is conducted at a temperature of 85° to 95° C.

24. The process of claim 18 further comprising:
   (j) contacting said solution from which said natrojarosite has been separated with a reactive sulfide to form copper sulfide and precipitating, separating and recovering said copper sulfide.

25. The process of claim 24 further comprising:
   (k) contacting the solution from which said copper sulfide has been separated with lime to form nickel hydroxide and precipitating, separating and recovering said nickel hydroxide.

26. The process of claim 18 further comprising:
   (j) contacting said solution from which said natrojarosite has been separated with hydrogen sulfide while maintaining said solution at a pH of about 3.5, a temperature of about 130° C and an H$_2$S pressure of about 115 psia to form a mixture of sulfides of nickel and copper and thereafter precipitating, separating and recovering said mixed sulfides.

27. The process of claim 18 further comprising:
   (j) raising the pH of said solution from which said natrojarosite has been separated to a pH in the range of 8 to 9 by contacting said solution with lime to form copper and nickel hydroxides and thereafter precipitating, separating and recovering said hydroxides.

* * * * *

UNITED STATES PATENT AND TRADEMARK OFFICE
CERTIFICATE OF CORRECTION

PATENT NO. : 4,108,639
DATED : August 22, 1978
INVENTOR(S) : Malcolm John Lake et al It is certified that error appears in the above-identified patent and that said Letters Patent are hereby corrected as shown below:

Column 7, line 45 (CLAIM 1g) "coper" should read --copper--.

In FIG. 1 an arrowhead should be present on the line which exits from the right side of block 48 at the point where that line meets line 42.

Signed and Sealed this

Seventeenth Day of April 1979

[SEAL]

Attest:

RUTH C. MASON
Attesting Officer

DONALD W. BANNER
Commissioner of Patents and Trademarks